(12) United States Patent
Kim

(10) Patent No.: US 11,818,453 B2
(45) Date of Patent: *Nov. 14, 2023

(54) METHOD FOR TRACKING TARGET OBJECTS IN A SPECIFIC SPACE, AND DEVICE USING THE SAME

(71) Applicant: Deeping Source Inc., Seoul (KR)

(72) Inventor: Tae Hoon Kim, Seoul (KR)

(73) Assignee: Deeping Source Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,647

(22) Filed: Jun. 10, 2022

(65) Prior Publication Data

US 2023/0007985 A1 Jan. 12, 2023

Related U.S. Application Data

(63) Continuation of application No. 17/511,734, filed on Oct. 27, 2021, now Pat. No. 11,388,330.

(30) Foreign Application Priority Data

Jul. 7, 2021 (KR) .................. 10-2021-0089369

(51) Int. Cl.
  *H04N 23/61* (2023.01)
  *G06T 7/254* (2017.01)
  *H04N 23/80* (2023.01)

(52) U.S. Cl.
  CPC ............ *H04N 23/61* (2023.01); *G06T 7/254* (2017.01); *H04N 23/80* (2023.01); *G06T 2207/20081* (2013.01)

(58) Field of Classification Search
  CPC ............ H04N 5/23218; H04N 5/23229; G06T 7/254; G06T 2207/20081

(Continued)

(56) References Cited

U.S. PATENT DOCUMENTS 10,956,726 B1 * 3/2021 Quark ..................... G06T 7/75
2019/0373210 A1 12/2019 Nguyen et al.
(Continued)

FOREIGN PATENT DOCUMENTS

JP 2019165431 A 9/2019
KR 102083192 B1 3/2020

OTHER PUBLICATIONS

European Extended Search Report issued in Application No. 22174748.8, dated Nov. 18, 2022.

(Continued)

*Primary Examiner* — Stephen P Coleman
(74) *Attorney, Agent, or Firm* — Amster, Rothstein & Ebenstein LLP

(57) ABSTRACT

A method for tracking one or more objects in a specific space is provided. The method includes steps of: (a) inputting original images of the specific space taken from camera to an obfuscation network and instructing the obfuscation network to obfuscate the original images to generate obfuscated images such that the obfuscated images are not identifiable as the original images by a human but the obfuscated images are identifiable as the original images by a learning network; (b) inputting the obfuscated images into the learning network, and instructing the learning network to detect obfuscated target objects, corresponding to target objects to be tracked, in the obfuscated images, to thereby output information on the obfuscated target objects; and (c) tracking the obfuscated target objects in the specific space by referring to the information on the obfuscated target objects.

16 Claims, 10 Drawing Sheets

(58) Field of Classification Search
USPC .................................................. 348/207.99
See application file for complete search history.

(56) References Cited

U.S. PATENT DOCUMENTS

2020/0005615 A1\* 1/2020 Madden ............... G06K 9/6215
2020/0327678 A1\* 10/2020 Wang ................... G06V 10/267
2021/0051294 A1\* 2/2021 Roedel .................... G06T 5/002

OTHER PUBLICATIONS

Maxim Maximov et al: "CIAGAN: Conditional Identity Anonymization Generative Adversarial Networks", arxiv.org, Cornell University Library, 201 Olin Library Cornell University Ithaca, NY 14853, Nov. 30, 2020 (Nov. 30, 2020), XP081825311.
Japanese Office Action issued in Application No. 2022-086785, dated Feb. 14, 2023.

\* cited by examiner

METHOD FOR TRACKING TARGET OBJECTS IN A SPECIFIC SPACE, AND DEVICE USING THE SAME

CROSS REFERENCE TO RELATED APPLICATION

This application is a Continuation Application of U.S. patent application Ser. No. 17/511,734, filed on Oct. 27, 2021, the entire contents of which being incorporated herein by reference.

FIELD OF THE DISCLOSURE

The present disclosure relates to a method for tracking one or more target objects in a specific space and a device thereof; and more particularly, a method for obfuscating the target objects and tracking the obfuscated target objects in the specific space and the device using the same.

BACKGROUND OF THE DISCLOSURE

A security system using a camera such as CCTV is commonly used for security of a specific place. Such a camera is installed not only inside of large buildings such as supermarkets, department stores, research laboratories and public institutions or inside of small buildings such as homes, daycare centers, convenience stores and banks, but also in public places such as public parks and roads. The places are monitored by using images in real-time or by analyzing recorded images.

However, the images taken in such multiuse facilities contain various identification information for persons who visited the corresponding facilities, and thus not only there is a limit in tracking the persons, but also there are many restrictions in analyzing the images containing the identification information due to a need for protecting private information.

In particular, even in case of checking the recorded images for incidents, etc. occurred in the corresponding facilities, even if a certain person is a party to the incident, the images of the certain person cannot be checked arbitrarily for protection of identification information of other persons whose faces are also taken in the images. Thus, in order to acquire the images for the incidents, there are problems of applying complicated operations such as obfuscating operations to some part of the images for the incidents in order to protect the identification information of said other persons.

Accordingly, the applicant proposes such a technology for tracking target objects, e.g., persons, through obfuscation in the images taken in the facilities.

SUMMARY OF THE DISCLOSURE

It is an object of the present disclosure to solve all the aforementioned problems.

It is another object of the present disclosure to allow obfuscated target objects to be tracked in a multiuse facility.

It is still another object of the present disclosure to allow specific obfuscated tracking information to be matched with specific non-obfuscated identification information in response to acquiring consent information on disclosure of the specific non-obfuscated identification information from a specific target object among the target objects.

It is still yet another object of the present disclosure to increase a usability of data by matching the specific obfuscated tracking information with the specific non-obfuscated identification information.

In order to accomplish the objects above, distinctive structures of the present disclosure are described as follows.

In accordance with one aspect of the present disclosure, there is provided a method for tracking one or more objects in a specific space, comprising steps of (a) an obfuscation tracking device inputting original images of the specific space taken from at least one camera to an obfuscation network and instructing the obfuscation network to obfuscate the original images to generate obfuscated images such that the obfuscated images are not identifiable as the original images by a human but the obfuscated images are identifiable as the original images by a learning network; (b) the obfuscation tracking device (i) inputting the obfuscated images into the learning network, and (ii) instructing the learning network to detect one or more obfuscated target objects, corresponding to one or more target objects to be tracked, in the obfuscated images, to thereby output information on the obfuscated target objects; and (c) the obfuscation tracking device tracking the obfuscated target objects in the specific space by referring to the information on the obfuscated target objects, and thereby generating one or more pieces of obfuscated tracking information.

In the above, the method may further comprise a step of (d) the obfuscation tracking device, in response to acquiring consent information on disclosure of specific non-obfuscated identification information from a specific target object among the target objects, matching specific obfuscated tracking information with the specific non-obfuscated identification information, wherein the specific obfuscated tracking information is acquired by tracking the specific target object.

At the step of (c), the obfuscation tracking device may confirm whether pre-acquired consent information on disclosure of non-obfuscated identification information corresponding to the obfuscated target objects is present, and wherein, in case a specific obfuscated target object is determined as having pre-acquired consent information on disclosure of specific non-obfuscated identification information, the obfuscation tracking device may match the specific non-obfuscated identification information with the specific obfuscated target object and may track the specific obfuscated target object matched with the specific non-obfuscated identification information.

At the step of (a), the obfuscation tracking device may acquire the obfuscated images generated by obfuscating the original images through the obfuscation network (i) from the one or more cameras or (ii) from NVR (network image recorder) that stores the original images.

The information on the obfuscated target objects may include obfuscated area data corresponding to the obfuscated target objects, location information of the obfuscated target objects and at least part of metadata of camera taking pictures of the obfuscated target objects.

The obfuscated tracking information may include trajectory information and status information of the target objects.

The obfuscation network may have been trained to obfuscate the original images such that the obfuscated images are not identifiable as the original images by the human but the obfuscated images are identifiable as the original images by the learning network, wherein a learning device may have trained the obfuscation network by performing processes of (i) inputting training data into the obfuscation network and instructing the obfuscation network to generate obfuscated training data by obfuscating the training data, (ii) (ii-1) inputting the obfuscated training data into the learning network with one or more trained parameters and (ii-2) instructing the learning network to apply at least one network operation to the obfuscated training data by using the trained parameters, to thereby generate characteristic information corresponding to the obfuscated training data and (iii) training the obfuscation network such that at least one first error is minimized which is calculated by referring to (1) the characteristic information or task specific output generated by using the characteristic information and (2) its corresponding ground truth and (iii-2) at least one second error is maximized which is calculated by referring to the training data and the obfuscated training data.

On condition that obfuscated training data score may has been acquired as the second error, wherein the obfuscated training data score corresponds to the obfuscated training data inputted to a discriminator capable of determining whether its input data is real or fake, the learning device (i) may train the obfuscation network such that the first error is minimized and the second error is maximized and (ii) may train the discriminator such that (ii-1) modified training data score or modified obfuscated training data score respectively corresponding to modified training data or modified obfuscated training data inputted into the discriminator is maximized, wherein the modified training data or the modified obfuscated training data is acquired respectively by modifying the training data or the obfuscated training data and (ii-2) the obfuscated training data score is minimized.

In accordance with another aspect of the present disclosure, there is provided an obfuscation tracking device for tracking one or more objects in a specific space, comprising at least one memory that stores instructions; and at least one processor configured to execute the instructions to perform or support another device to perform: (I) inputting original images of the specific space taken from at least one camera to an obfuscation network and instructing the obfuscation network to obfuscate the original images to generate obfuscated images such that the obfuscated images are not identifiable as the original images by a human but the obfuscated images are identifiable as the original images by a learning network; (II) inputting the obfuscated images into the learning network, and instructing the learning network to detect one or more obfuscated target objects, corresponding to one or more target objects to be tracked, in the obfuscated images, to thereby output information on the obfuscated target objects; and (III) tracking the obfuscated target objects in the specific space by referring to the information on the obfuscated target objects.

In the above, the processor further performs a process of (IV) in response to acquiring consent information on disclosure of specific non-obfuscated identification information from a specific target object among the target objects, matching specific obfuscated tracking information with the specific non-obfuscated identification information, wherein the specific obfuscated tracking information is corresponding to the specific target object.

In the above, at the process of (III), the processor may confirm whether pre-acquired consent information on disclosure of non-obfuscated identification information corresponding to the obfuscated target objects is present, and wherein, in case a specific obfuscated target object is determined as having pre-acquired consent information on disclosure of specific non-obfuscated identification information, the obfuscation tracking device matches the specific non-obfuscated identification information with the specific obfuscated target object and tracks the specific obfuscated target object matched with the specific non-obfuscated identification information.

In the above, at the process of (I), the processor may acquire the obfuscated images generated by obfuscating the original images through the obfuscation network (i) from the one or more cameras or (ii) from NVR (network image recorder) that stores the original images.

In the above, the information on the obfuscated target objects may include obfuscated area data corresponding to the obfuscated target objects, location information of the obfuscated target objects and at least part of metadata of camera taking pictures of the obfuscated target objects.

In the above, the obfuscated tracking information may include trajectory information and status information of the target objects.

In the above, the obfuscation network has been trained to obfuscate the original images such that the obfuscated images are not identifiable as the original images by the human but the obfuscated images are identifiable as the original images by the learning network, wherein a learning device has trained the obfuscation network by performing processes of (i) inputting training data into the obfuscation network and instructing the obfuscation network to generate obfuscated training data by obfuscating the training data, (ii) (ii-1) inputting the obfuscated training data into the learning network with one or more trained parameters and (ii-2) instructing the learning network to apply at least one network operation to the obfuscated training data by using the trained parameters, to thereby generate characteristic information corresponding to the obfuscated training data and (iii) training the obfuscation network such that at least one first error is minimized which is calculated by referring to (1) the characteristic information or task specific output generated by using the characteristic information and (2) its corresponding ground truth and (iii-2) at least one second error is maximized which is calculated by referring to the training data and the obfuscated training data.

In the above, on condition that obfuscated training data score has been acquired as the second error, wherein the obfuscated training data score corresponds to the obfuscated training data inputted to a discriminator capable of determining whether its input data is real or fake, the learning device (i) trains the obfuscation network such that the first error is minimized and the second error is maximized and (ii) trains the discriminator such that (ii-1) modified training data score or modified obfuscated training data score respectively corresponding to modified training data or modified obfuscated training data inputted into the discriminator is maximized, wherein the modified training data or the modified obfuscated training data is acquired respectively by modifying the training data or the obfuscated training data and (ii-2) the obfuscated training data score is minimized.

In addition, there is further provided a computer readable record medium for recording a computer program for executing a method of present disclosure.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION OF THE PREFERRED EMBODIMENTS

Figure 1:
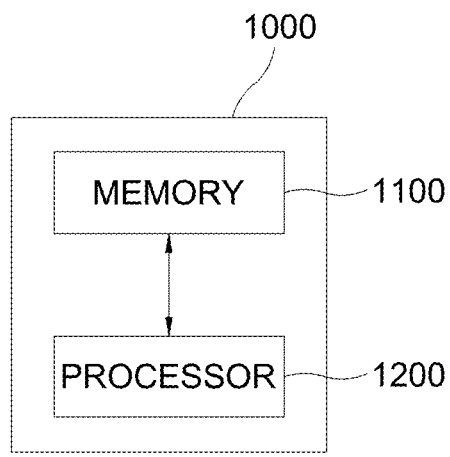
FIG. 1 is a drawing schematically illustrating an obfuscation tracking device for tracking target objects in a specific space in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained in detail as shown below by referring to attached drawings.

FIG. 1 is a drawing schematically illustrating an obfuscation tracking device for tracking target objects in a specific space in accordance with one example embodiment of the present disclosure.

By referring to FIG. 1, the obfuscation tracking device 1000 may include a memory 1100 for storing instructions to track the target objects in the specific space, and a processor 1200 for performing operations for tracking the target objects in the specific space according to the instructions stored in the memory 1100.

Specifically, the obfuscation tracking device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

Meanwhile, the processor 1200 of the obfuscation tracking device 1000 may perform processes of (i) inputting original images of the specific space taken from at least one camera to an obfuscation network and instructing the obfuscation network to obfuscate the original images to generate obfuscated images such that the obfuscated images are not identifiable as the original images by a human but the obfuscated images are identifiable as the original images by a learning network, (ii) inputting the obfuscated images into the learning network, and instructing the learning network to detect one or more obfuscated target objects, corresponding to one or more target objects to be tracked, in the obfuscated images, to thereby output information on the obfuscated target objects, and (iii) tracking the obfuscated target objects in the specific space by referring to the information on the obfuscated target objects. Accordingly, each pieces of obfuscated tracking information can be acquired for each of the obfuscated target objects.

A method for tracking the target objects in the specific space by using the obfuscation tracking device 1000 in accordance with one example embodiment of the present disclosure as configured above is explained as follows.

Figure 2:
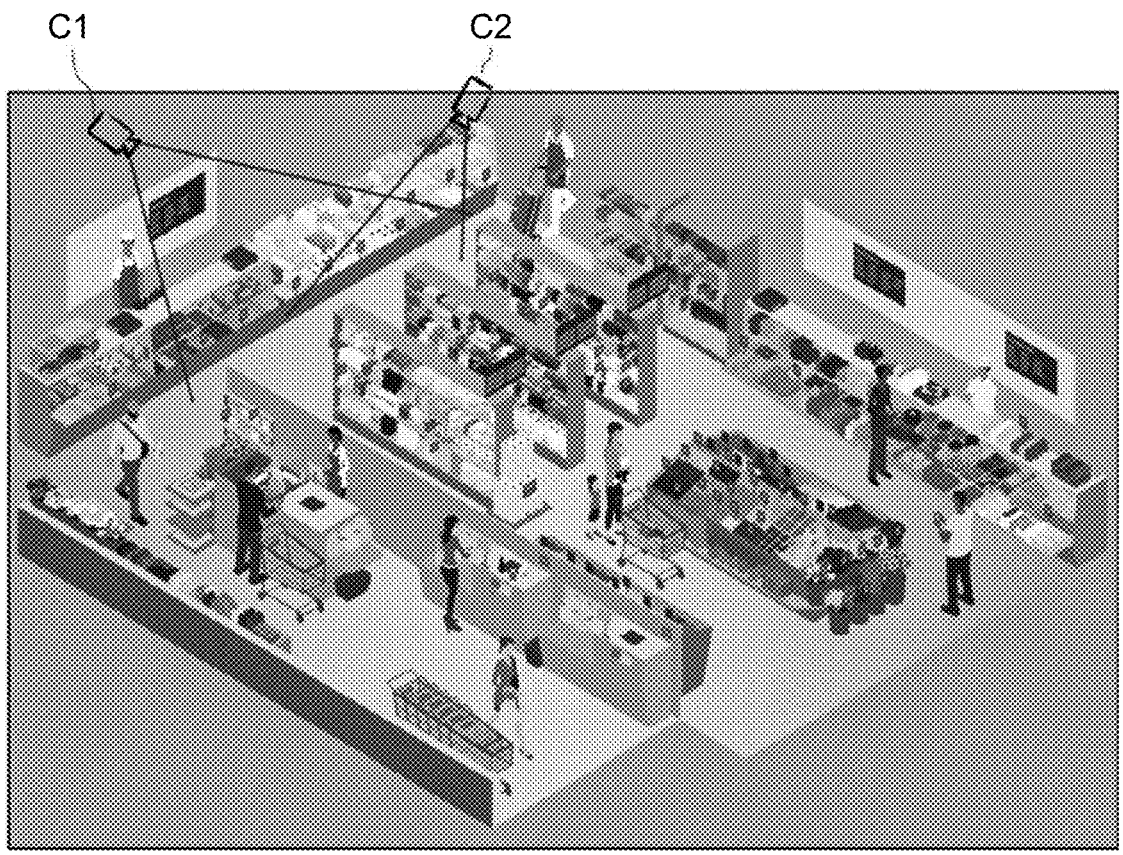
FIG. 2 is a drawing schematically illustrating a space image taken through one or more cameras in a method for tracking the target objects in the specific space in accordance with one example embodiment of the present disclosure.

Firstly, referring to FIG. 2, one or more original images of the specific space may be acquired from one or more cameras C1 and C2 installed in the specific space.

Herein, the camera may include a CCTV, but it is not limited thereto, and may include all cameras taking images, e.g., consecutive frames, of the specific space. In addition, the cameras may be installed to cover all areas of the specific area, and at least two adjacent cameras among the cameras may be installed to secure a common vision therebetween. Accordingly, occlusion of the target objects in the specific space can be minimized. Further, even if there is the occlusion of some of the target objects in some areas, said some of the target objects can be tracked by using appearance features of said some of the target objects.

Figure 3:
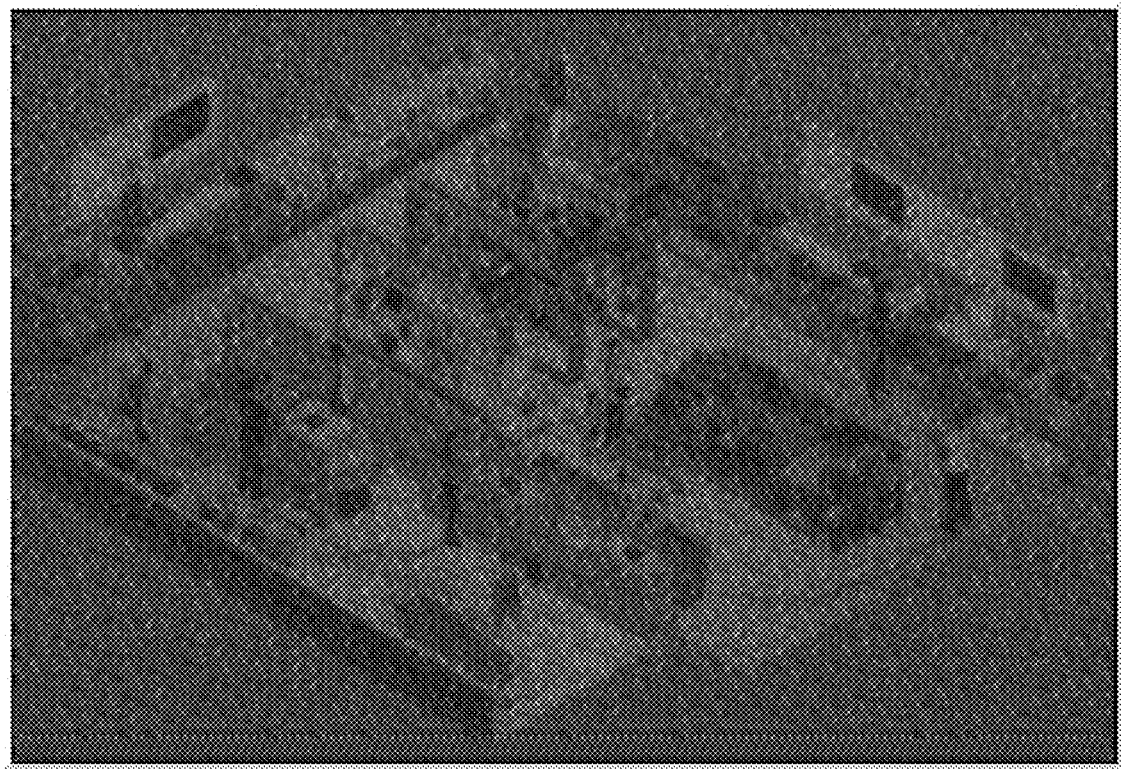
FIG. 3 is a drawing schematically illustrating an obfuscated space image which is acquired by obfuscating the space image taken through the cameras in accordance with one example embodiment of the present disclosure.

Next, referring to FIG. 3, the obfuscation tracking device 1000 may acquire obfuscated images by obfuscating the original images, e.g., each frame of the original images, taken from the cameras C1 and C2 through the obfuscation network.

In addition, the obfuscation of the original images may be performed such that the obfuscated images are not identifiable as the original images by a human but the obfuscated images are identifiable as the original images by the learning network. A process of training the obfuscation network will be explained as follows.

Moreover, the obfuscation of the original images may be performed by each of the cameras C1 and C2 taking images inside the specific space or by the obfuscation tracking device 1000 which receives the images taken from the cameras C1 and C2.

As another example, the obfuscation of the original images may be performed in NVR (network video recorder) which stores the images taken from the cameras C1 and C2.

Herein, the NVR may be connected to the obfuscation tracking device 1000 over a network, or the NVR itself may be included in the obfuscation tracking device 1000. However, the present disclosure is not limited thereto, and the obfuscation of the original images can be performed in various devices or facilities with the obfuscation network installed.

Figure 4:
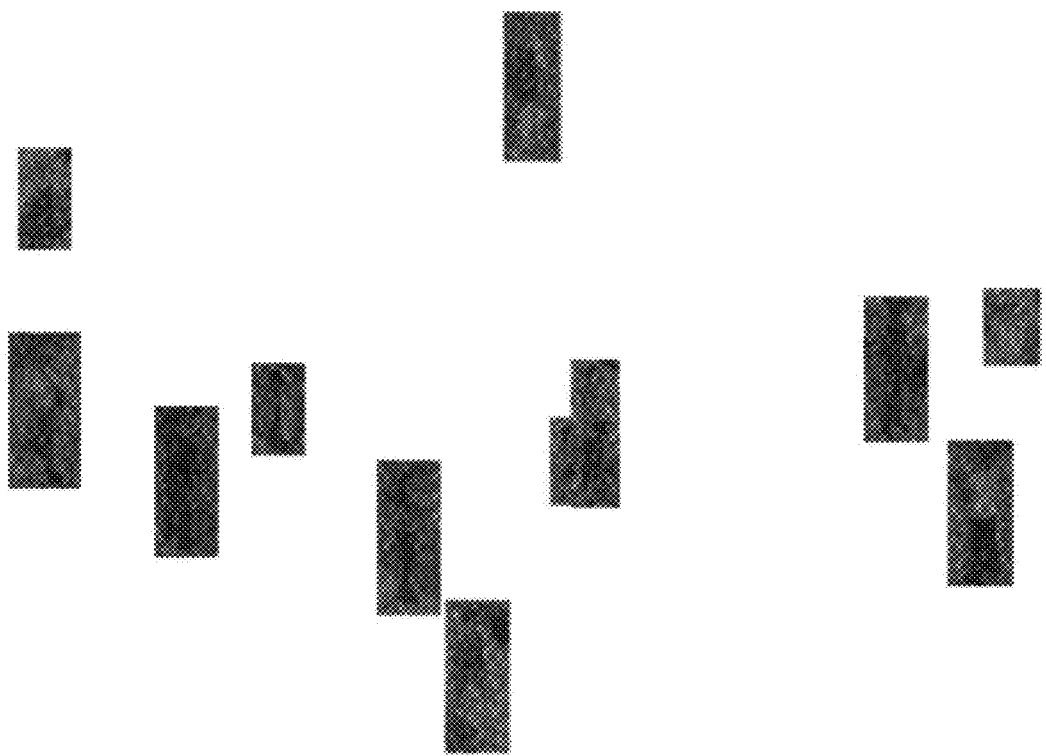
FIG. 4 is a drawing schematically illustrating a status of specific obfuscated target objects being detected in the obfuscated space image in accordance with one example embodiment of the present disclosure.

Next, referring to FIG. 4, the obfuscation tracking device 1000 may input the obfuscated images into the learning network, and instruct the learning network to detect the obfuscated target objects, corresponding to the target objects to be tracked, in the obfuscated images, to thereby output information on the obfuscated target objects. Herein, the information on the obfuscated target objects may include obfuscated area data corresponding to the obfuscated target objects, location information of the obfuscated target objects and at least part of metadata of the cameras taking pictures of the obfuscated target objects. In addition, the metadata of the cameras may include camera identification information and location information of the cameras.

In addition, the obfuscation tracking device 1000 deletes other areas excluding the obfuscated target objects from the obfuscated images, to thereby prevent the exposure of identification information of other objects.

Figure 5:
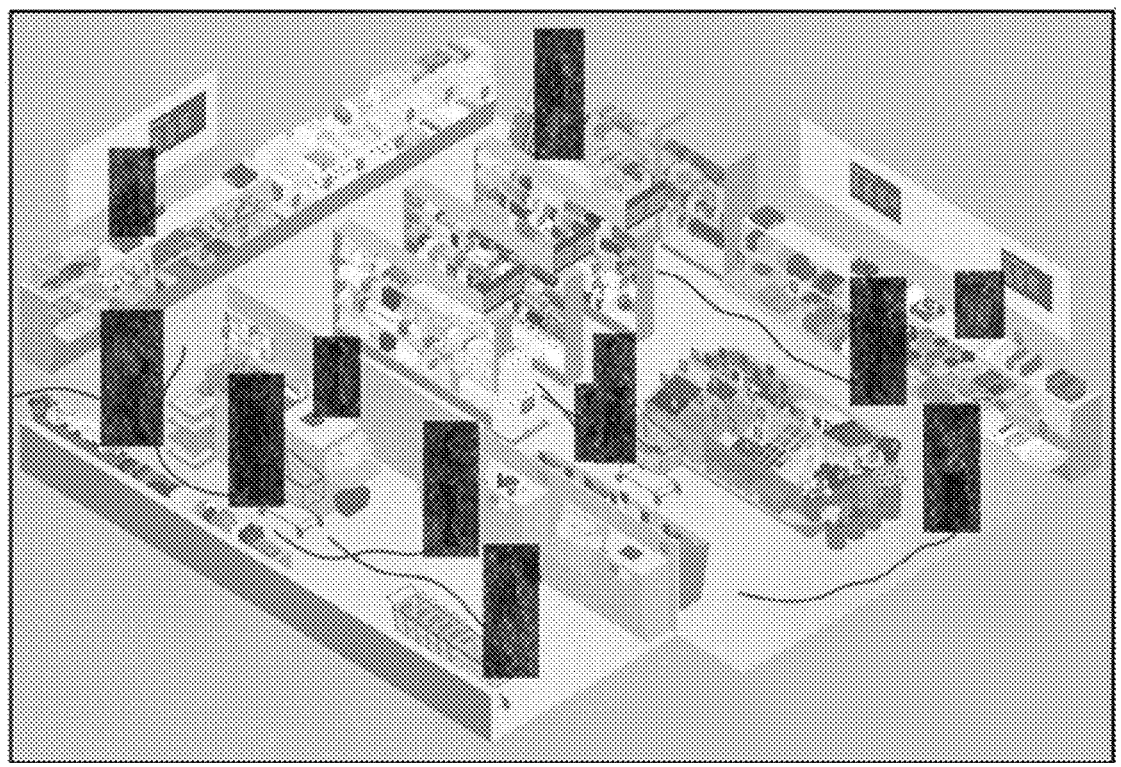
FIG. 5 is a drawing schematically illustrating a status of the specific obfuscated target objects being tracked in accordance with one example embodiment of the present disclosure.

Next, referring to FIG. 5, the obfuscation tracking device 1000 may track the obfuscated target objects in the specific space by referring to the information on the obfuscated target objects, thereby generating one or more pieces of the obfuscated tracking information.

Herein, the obfuscated tracking information may include trajectory information and status information of the obfuscated target objects.

As an example, the obfuscation tracking device 1000 may extract characteristic information from the area data of the obfuscated target objects, and may detect the status information such as identifier information, posture information, behavior information, interest information and facial impression information of the obfuscated target objects by using the characteristic information.

Moreover, the obfuscation tracking device 1000 may track moved location of the obfuscated target objects in each frame of the obfuscated images by checking the location information of the obfuscated target objects and the metadata of the cameras, to thereby acquire the trajectory information of the obfuscated target objects in the specific space.

That is, the obfuscation tracking device 1000 detects the obfuscated target objects, e.g., obfuscated target persons, and analyzes movement, behavior, interest or facial impression, etc. of each of the obfuscated target objects without an infringement of identification information of other persons in real-time or through recorded obfuscated images.

Moreover, the obfuscation tracking device 1000 may easily track the flow of the obfuscated target objects through the common vision between the adjacent cameras, and in case there is some occlusion on a certain target object among the obfuscated target objects, it may track the occluded certain target object by matching it with the appearance features thereof.

That is, in order to estimate the locations of the target objects in the specific space from the locations of the target objects viewed from the cameras, the locations on the floor or the ground of the target objects are estimated from the images, and the estimated locations on the floor or the ground are projected to the actual space (floor plan or ground plan), thereby acquiring the global positions of the target objects from the local positions of the target objects. Herein, a global single trajectory may be acquired from the multiple cameras by using one of (i) a method for clustering (in a dot unit) a plurality of global positions of a certain target object taken from the multiple cameras, (ii) a method for clustering each trajectory of the global positions obtained separately for each of the cameras for each predetermined time interval, and (iii) a method for firstly finding correlations between the adjacent cameras, removing the noise therein, and obtaining the global positions.

Meanwhile, the obfuscation tracking device 1000 may confirm whether pre-acquired consent information on disclosure of non-obfuscated identification information corresponding to the obfuscated target objects is present. In case a specific obfuscated target object is determined as having pre-acquired consent information on disclosure of specific non-obfuscated identification information, the obfuscation tracking device 1000 matches the specific non-obfuscated identification information with the specific obfuscated target object and generates specific non-obfuscated tracking information by tracking the specific obfuscated target object matched with the specific non-obfuscated identification information.

As another example, it is assumed that there is no pre-acquired consent information on the disclosure of the non-obfuscated identification information.

Figure 6:
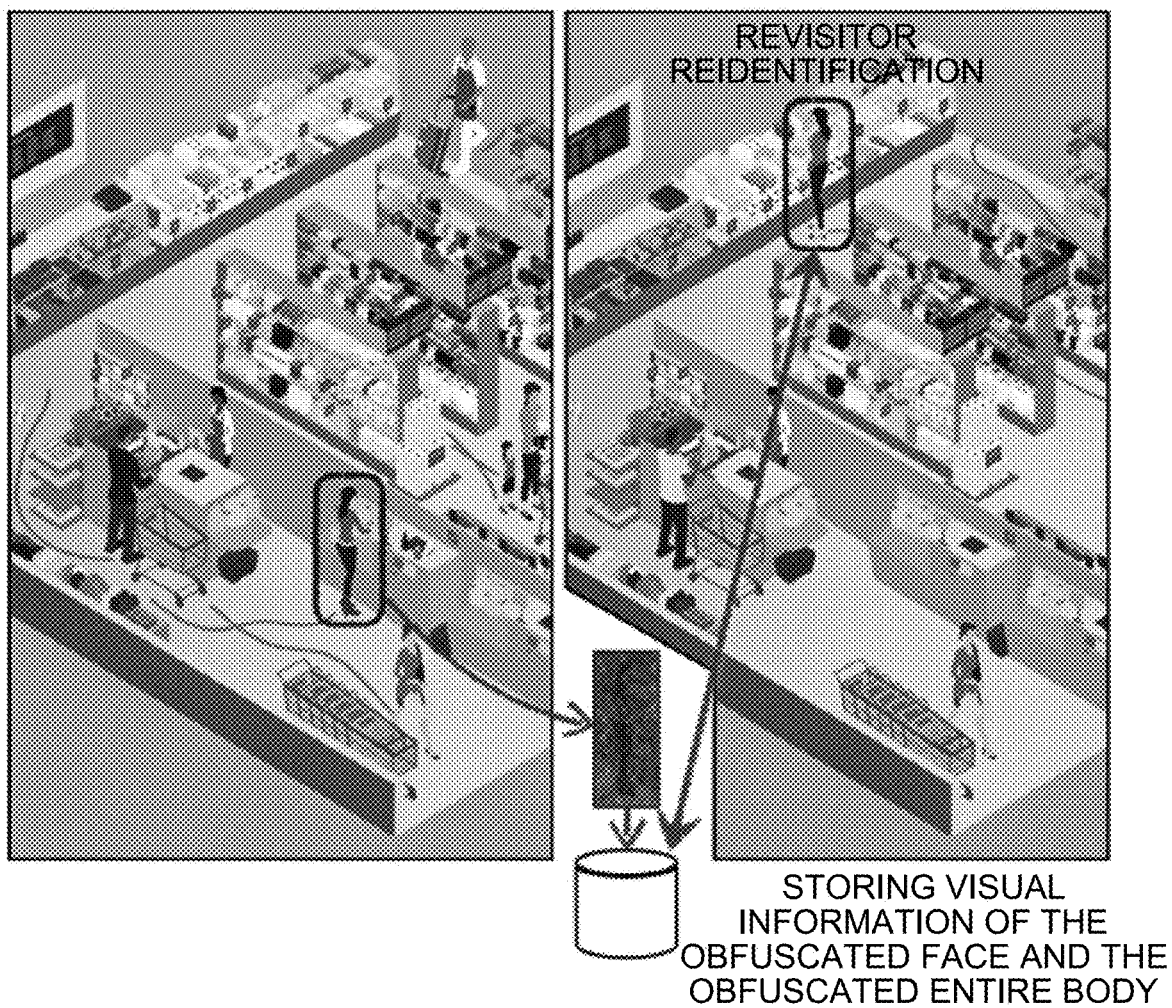
FIG. 6 is a drawing schematically illustrating a status of specific obfuscated tracking information being matched with specific non-obfuscated identification information in accordance with one example embodiment of the present disclosure.

Referring to FIG. 6, the obfuscation tracking device 1000, in response to acquiring consent information on disclosure of the specific non-obfuscated identification information from the specific target object, i.e., the specific target person, (at the time when the specific target person pays for goods with his or her credit card through a POS terminal), may match the specific obfuscated tracking information with the specific non-obfuscated identification information. Herein the specific obfuscated tracking information is acquired by tracking the specific target object. Then the obfuscation tracking device 1000 may generate the specific non-obfuscated tracking information by assigning the specific non-obfuscated identification information to the specific obfuscated tracking information.

That is, in case of the specific target object(s) consented to image analysis, the obfuscation tracking device 1000 may provide the analysis information for each of the specific target objects by matching each piece of the specific obfuscated tracking information of the specific target objects with each piece of the specific non-obfuscated identification information.

As an example, in case of a supermarket, customers in the images taken by the multiple cameras in the supermarket are obfuscated and tracked. Then, if at least one specific customer consents to the image analysis upon payment at the POS terminal, the specific obfuscated tracking information of the specific customer may be matched with identification information on the specific customer, i.e., the specific non-obfuscated identification information, and then the specific non-obfuscated identification information may be used as statistics to analyze various patterns of the specific customer in the supermarket. Otherwise, in case of other customers who does not consent to the image analysis, only the obfuscated tracking information may be used as statistics to analyze some patterns of said other customers in the supermarket.

Meanwhile, the specific customer who consented to the image analysis visits the supermarket again, the specific customer is automatically recognized and analyzed by using the specific obfuscated tracking information corresponding to the specific non-obfuscated identification information of the specific customer in the supermarket, and according to the result of the analysis, various pieces of information customized to the specific customer may be provided.

Moreover, even in case the specific customer visits another branch of the supermarket, the specific customer can be identically recognized and tracked in said another branch.

Accordingly, the present disclosure may track moving paths in a large scale space (such as an entire area of a building) without an infringement of identification information of visitors in the large scale space such as supermarkets and shopping malls by using the existing obfuscation technology.

Herein, the tracking process in the obfuscated status (also known as anonymous tracking) has a limit in usability since it can provide only simple information at the low level of statistics. That is, in case a membership system of supermarkets or shopping malls or an entry system of a building is used, a consent to video analysis may be obtained for some visitors, but there may be some other visitors who did not consent thereto in the public places. Thus the tracking process in the obfuscated status is still necessary. Accordingly, the present disclosure may considerably increase the usability of data (i) by basically managing the result of video analysis such as moving paths and behaviors in the obfuscated status, and (ii) upon confirmation that the specific person consented to the video analysis, by matching identification information of the specific person with the existing obfuscated tracking information of the specific person.

Meanwhile, a method for training the obfuscation network capable of obfuscating the original images is explained as follows.

Figure 7:
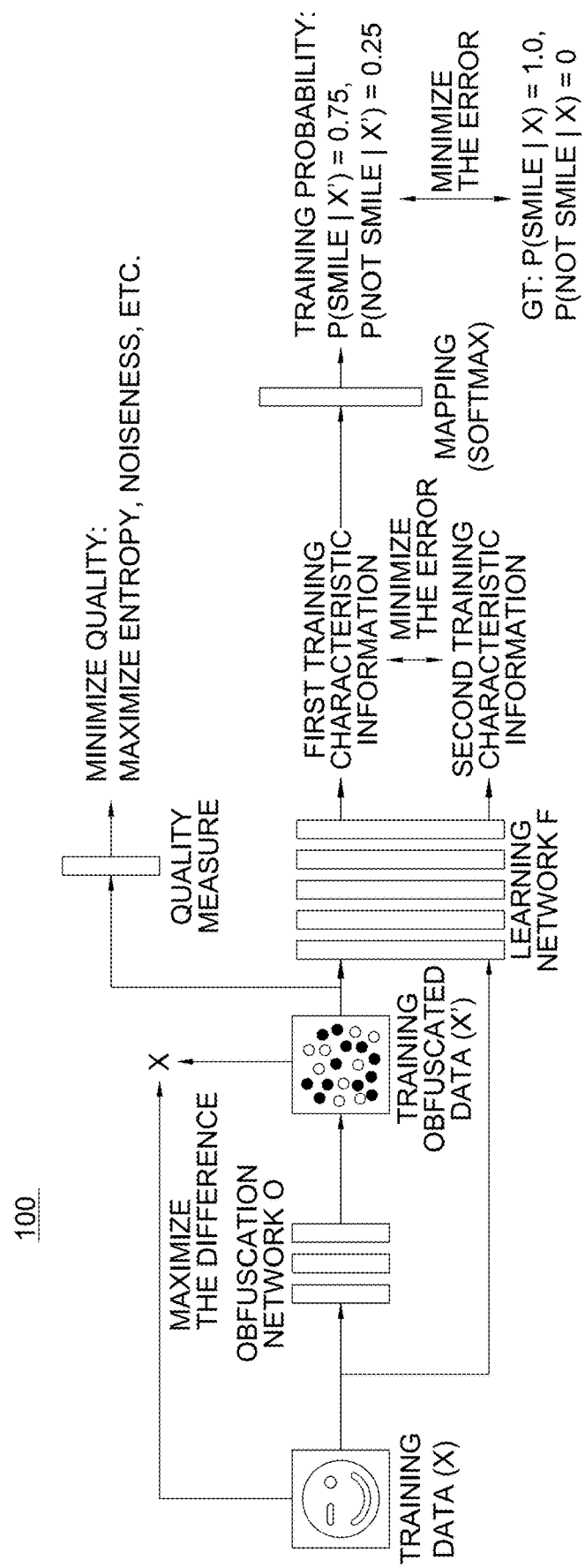
FIG. 7 is a drawing schematically illustrating a method for training an obfuscation network capable of obfuscating images taken from the cameras in accordance with one example embodiment of the present disclosure.

FIG. 7 is a drawing schematically illustrating a method for training the obfuscation network capable of obfuscating the images taken from the cameras in accordance with one example embodiment of the present disclosure.

Firstly, in response to acquiring training data x, a learning device 100 inputs the training data x in the obfuscation network O, and instructs the obfuscation network to obfuscate the training data x, to thereby generate obfuscated training data x', i.e., O(x).

Herein, the training data x may be original training data, which is original data for use in training, or modified training data acquired by modifying the original training data. Herein, the modified training data may be generated by adding a random noise generated through a random noise generation network (not illustrated) into the original training data. As an example, the random noise generation network is instructed to generate the random noise according to a normal distribution $N(0, \sigma)$, and the modified training data may be generated by adding the generated random noise into the original training data. As another example, the modified training data may be generated by blurring the original training data or by modifying a resolution of the original training data, but it is not limited thereto, and various methods for modifying the original training data may be applied.

Moreover, the obfuscated training data x' is recognized differently from the training data x to humans, but may be recognized to be identical or similar to the training data x in the learning network.

Meanwhile, as an example, the obfuscation network O may include (i) an encoder having a plurality of convolution layers for applying convolutional operations to the inputted training data x and (ii) a decoder having a plurality of deconvolution layers for applying deconvolutional operations to an output of the encoder, to thereby output the obfuscated training data x', but it is not limited thereto. For example, the obfuscation network O may include the learning network for obfuscating the inputted training data to generate the obfuscated training data.

Next, the learning device 100 may input the obfuscated training data x' into the learning network F with trained parameters and instruct the learning network F to apply learning operations to the obfuscated training data x' by using the trained parameters, to thereby generate first training characteristic information F(x') corresponding to the obfuscated training data x' and may input the training data x into the learning network F and instruct the learning network F to apply learning operations to the training data x by using the trained parameters, to thereby generate second training characteristic information F(x).

Herein, the learning network F may include a machine learning network, but it is not limited thereto, and may include all learning networks capable of (i) outputting the first training characteristic information F(x') by applying learning operations to the obfuscated training data x' according to the trained parameters and (ii) outputting the second training characteristic information F(x) by applying learning operations to the training data x according to the trained parameters. In addition, the machine learning network may include one or more of k-Nearest Neighbors, Linear Regression, Logistic Regression, Support Vector Machine (SVM), Decision Tree and Random Forest, Neural Network, Clustering, Visualization and Dimensionality Reduction, Association Rule Learning, Deep Belief Network, Reinforcement Learning and Deep learning algorithm, but the machine learning network is not limited thereto, and may include various learning algorithms.

In addition, the first training characteristic information F(x') and the second training characteristic information F(x) may be features or logits for the training data x. Moreover, the first training characteristic information F(x') and the second training characteristic information F(x) may be (i) features associated with the predetermined characteristics in the training data x or (ii) logits including values related to one or more vectors, matrices and coordinates related to the predetermined characteristics. For example, in case the training data x is a facial image data, the features or the logits may be a class for facial recognition, facial features, as an example, status for a smile, or a coordinate for facial landmark point (for example, the two endpoints of eyes).

Next, the learning device 100 may train the obfuscation network such that at least one first error is minimized which is calculated by referring to the first training characteristic information F(x') and the second training characteristic information F(x) and such that at least one second error is maximized which is calculated by referring to the training data x and the obfuscated training data x'. That is, the learning device 100 trains the obfuscation network O such that the learning device 100 outputs the obfuscated training data x' having a considerable difference from the training data x by using the second error and such that the learning device 100 outputs the obfuscated training data x' to be recognized identical or similar to the training data x in the learning network F by using the first error.

Herein, the learning device 100 may acquire the first error by using the difference between the first training characteristic information F(x') and the second training characteristic information F(x). As one example, the learning device 100 may acquire the first error by using the cosine similarity or the norm of the first training characteristic information F(x') and the second training characteristic information F(x), but it is not limited thereto, and various algorithms that can calculate the difference between the first training characteristic information F(x') and the second characteristic information F(x) may be applied. Moreover, the learning device 100 may acquire the second error by the difference between the training data x and the obfuscated training data x'.

As another example, the learning device 100 may acquire the first error using at least one class loss acquired by referring to each probability of each class of the obfuscated training data x' being recognized as a result of mapping the first training characteristic information F(x') into each class and the ground truth corresponding to the training data x. Herein, said each probability may represent each of probabilities of the first training characteristic information F(x') outputted from the learning network F being the correct answer for each of classes. For example, in case the training data is a facial image data, a probability of the face being in a smiling status may be outputted as 0.75, and a probability of the face being not in the smiling status may be outputted as 0.25 and the like. Herein, a softmax may be used in matching the first training characteristic information F(x') outputted from the learning network F by each class, but it is not limited thereto, and various algorithms for matching the first training information F(x) by each class may be used.

That is, the learning device 100 may train the obfuscation network O such that the first error is minimized which is calculated by adding the class loss to the difference between the first training characteristic information F(x') and the second training characteristic information F(x) and such that the second error is maximized which is calculated by referring to the difference between the training data x and the obfuscated training data x'.

Moreover, the learning device 100 may measure a quality by referring to at least part of entropy and the degree of noise of the obfuscated data x', and acquire the first error by further referring to the measured quality. That is, the learning device 100 may train the obfuscation network O such that the quality of the obfuscated training data x' is minimized and such that the entropy and the noise, etc. of the obfuscated training data x' are maximized.

In addition, in case the learning device 100 trains the obfuscation network O such that the first error is minimized and the second error is maximized, the trained parameters of the learning network F are fixed, i.e., not updated, and training processes are applied only to the obfuscation network O.

Figure 8:
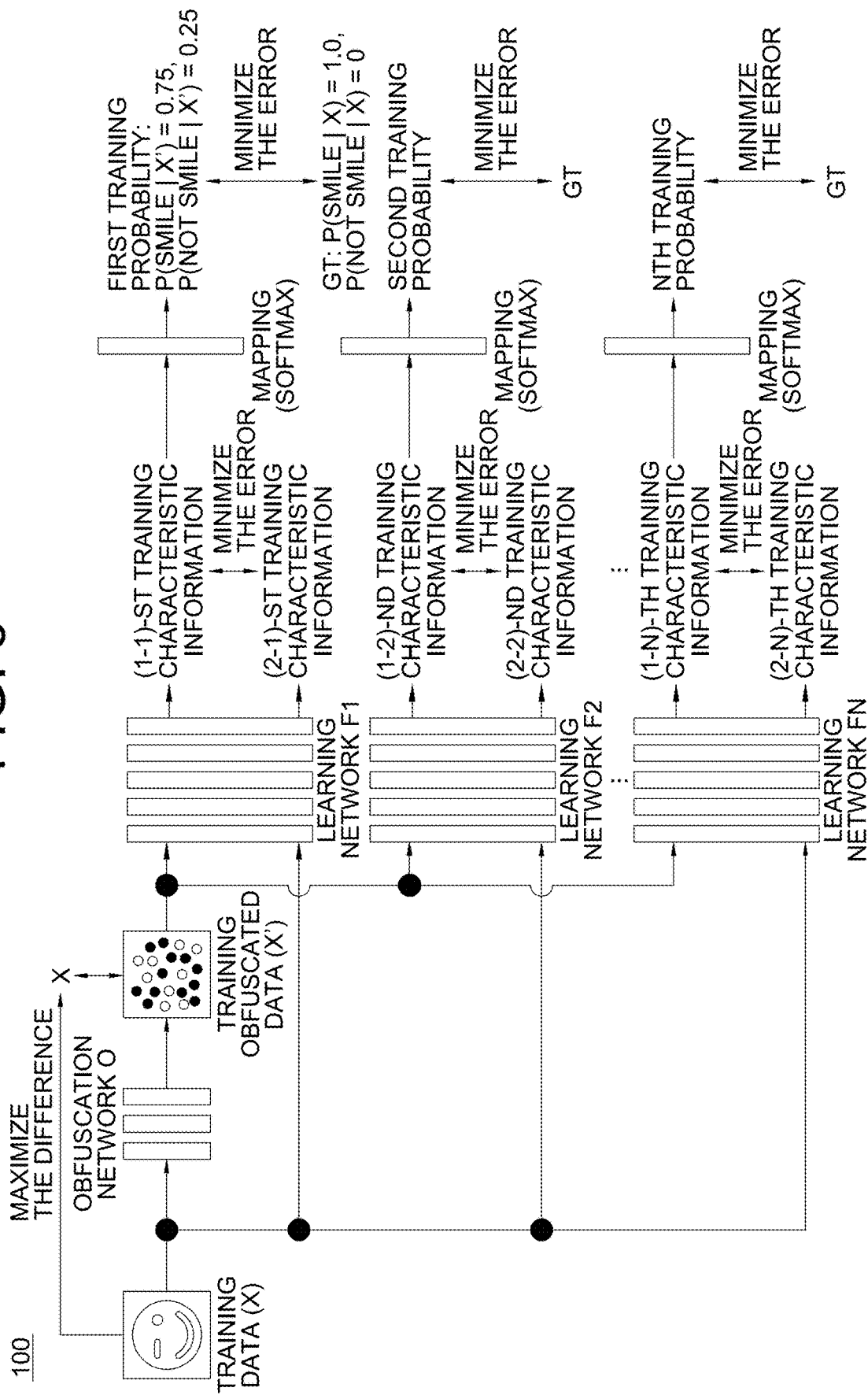
FIG. 8 is a drawing schematically illustrating another method for training the obfuscation network capable of obfuscating the images taken from the cameras in accordance with one example embodiment of the present disclosure.

FIG. 8 is a drawing schematically illustrating another method for training the obfuscation network capable of obfuscating the images taken from the cameras in accordance with one example embodiment of the present disclosure.

As shown in FIG. 8, the learning network F can be configured as the plurality of learning networks F1, F2, . . . , Fn having trained parameters. In the explanation below, the detailed description easily understandable from the explanation of FIG. 7 above shall be omitted.

Firstly, in response to acquiring the training data x, the learning device 100 inputs the training data x into the obfuscation network O, and instructs the obfuscation network to obfuscate the training data x, to thereby generate obfuscated training data x', i.e., O(x).

Herein, the training data x may be the original training data or the modified training data acquired by modifying the original training data. Moreover, the obfuscated training data x' is recognized differently from the training data x to humans, but may be recognized identical or similar to the training data x by the learning network.

Next, the learning device 100 may input the obfuscated training data x' respectively into a first learning network F1 to an n-th learning network Fn with at least one first trained parameter to at least one n-th trained parameter, and instruct the first learning network F1 to the n-th learning network Fn to apply learning operations to the obfuscated training data x' by using the first trained parameter to the n-th trained parameter respectively, to thereby generate (1-1)-st training characteristic information F1(x') to (1-n)-th training characteristic information Fn(x') corresponding to the obfuscated training data x'. In addition, the learning device 100 may input the training data x respectively into the first learning network F1 to the n-th learning network Fn with the first trained parameter to the n-th trained parameter, and instruct the first learning network F1 to the n-th learning network Fn to apply learning operations to the training data x by using the first trained parameter to the n-th trained parameter respectively, to thereby generate (2-1)-st training characteristic information F1(x) to (2-n)-th training characteristic information Fn(x).

Next, the learning device 100 may train the obfuscation network O such that the first error is minimized which is the average of the (1-1)-st error calculated by referring to the (1-1)-st training characteristic information F1(x') and the (2-1)-st training characteristic information F1(x) to the (1-n)-th error calculated by referring to the (1-n)-th training characteristic information Fn(x') and the (2-n)-th training characteristic information Fn(x), and such that the second error is maximized which is calculated by referring to the training data x and the obfuscated training data x'.

That is, the learning device 100 acquires the (1-1)-st error calculated by referring to the (1-1)-st training characteristic information F1(x') and the (2-1)-st training characteristic information F1(x), and acquires the (1-2)-nd error calculated by referring to the (1-2)-nd training characteristic information F2(x') and the (2-2)-nd training characteristic information F2(x), and so on. As a result, the learning device 100 acquires the (1-n)-th error calculated by referring to the (1-n)-th training characteristic information Fn(x') and the (2-n)-th training characteristic information Fn(x). Then, the learning device 100 acquires the first error by using the average of the (1-1)-st error to the (1-n)-th error. In addition, the learning device 100 may train the obfuscation network O such that the first error is minimized and the second error is maximized.

Meanwhile, the learning device 100 acquires the (1-1)-st error by further referring to a first class loss. Herein, the first class loss is acquired by referring to a first probability of each class of the obfuscated training data x' being recognized as a result of mapping the (1-1)-st training characteristic information F(x') into each class and the ground truth corresponding to the training data x. That is, the learning device 100 may acquire the (1-1)-st error by adding the first class loss to the difference between the (1-1)-st training characteristic information F1(x') and the (2-1)-st training characteristic information F1(x). In addition, the learning device 100 acquires (1-2)-nd error by further referring to a second class loss. Herein, the second class loss is acquired by referring to the second probability of each class of the obfuscated training data x' being recognized as a result of mapping the (1-2)-nd training characteristic information F2(x') into each class and the ground truth corresponding to the training data x. That is, the learning device 100 acquires the (1-n)-th error by further referring to an n-th class loss acquired. Herein, the n-th class loss is acquired by referring to the n-th probability of each class of the obfuscated training data x' being recognized as a result of mapping the (1-n)-th training characteristic information Fn(x') into each class and the ground truth corresponding to the training data x. Then, the learning device 100 may acquire the first error which is the average of the calculated (1-1)-st error to (1-n)-th error. In addition, the learning device 100 may train the obfuscation network O such that the first error is minimized, and the second error is maximized.

Moreover, the learning device 100 may measure a quality by referring to at least part of entropy and the degree of noise of the obfuscated data x', and acquire the first error by further referring to the measured quality. That is, the learning device 100 may train the obfuscation network O such that the quality of the obfuscated training data x' is minimized and such that the entropy and the noise, etc. of the obfuscated training data x' are minimized.

In addition, in case the learning device 100 trains the obfuscation network O such that the first error is minimized and the second error is maximized, the trained parameters of the learning network F are fixed, i.e., not updated, and training processes are applied only to the obfuscation network O.

In the above, the (1-1)-st error to the (1-n)-th error are calculated by using (i) the (1-1)-st training characteristic information F1(x') to the (1-n)-th training characteristic information Fn(x') acquired by inputting the obfuscated training data x' respectively into the first learning network F1 to the n-th learning network Fn and (ii) the (2-1)-st training characteristic information F1(x) to the (2-n)-th training characteristic information Fn(x) acquired by inputting the training data x respectively into the first learning network F1 to the n-th learning network Fn. And, the first error is acquired by using the average of the (1-1)-st error to the (1-n)-th error. Then, the obfuscation network O is trained such that the first error is minimized and the second error is maximized.

However, unlike the above, the learning device 100 may train the obfuscation network O sequentially such that the (1-1)-st error to the (1-n)-th error are minimized.

That is, the learning device 100 inputs the training data x into the obfuscation network O, and instructs the obfuscation network O to generate a first obfuscated training data x1' by obfuscating the training data x. In addition, the learning device 100 (1) inputs the first obfuscated training data x1' into the first learning network F1, and instructs the first learning network F1 to apply learning operations to the first obfuscated training data x1' by using at least one first trained parameter of the first learning network F1, to thereby output the (1-1)-st training characteristic information F1(x1') for the first obfuscated training data x1', and (2) inputs the training data x into the first learning network F1, and instructs the first learning network F1 to apply learning operations to the training data x by using the first trained parameter of the first learning network F1, to thereby output the (2-1)-st training characteristic information F1(x) for the training data x. Thereafter, the learning device 100 trains the obfuscation network O such that (1-1)-st error is minimized which is calculated by referring to the (1-1)-st training characteristic information F1(x1') and the (2-1)-st training characteristic information F1(x) and such that the (2-1)-st error is maximized which is calculated by referring to the training data x and the first obfuscated training data x1', thereby allowing the obfuscation network O to become a first trained obfuscation network O1.

In addition, the learning device 100 applies the above-mentioned processes to the second learning network F2 to the n-th learning network Fn, thereby sequentially generating a second trained obfuscation network O2 to an n-th trained obfuscation network On.

That is, while increasing a constant k from 2 to n, the learning device 100 inputs the training data x into a (k−1)-st trained obfuscation network O(k−1), and instructs the (k−1)-st trained obfuscation network O(k−1) to generate a k-th obfuscated training data xk' by obfuscating the training data x. In addition, the learning device 100 may (1) input the k-th obfuscated training data xk' into the k-th learning network, and instruct the k-th learning network Fk to apply learning operations to the k-th obfuscated training data xk' by using at least one k-th trained parameter of the k-th learning network Fk, to thereby output (1-k)-th training characteristic information Fn(xk') for the k-th obfuscated training data xk', and (2) input the training data x into the k-th learning network Fk, and instructs the k-th learning network Fk to apply learning operations to the training data x by using the k-th trained parameter of the first learning network Fk, to thereby output (2-k)-th training characteristic information Fk(xk) for the training data x. Thereafter, the learning device 100 may train the (k−1)-st trained obfuscation network O(k−1) such that (1-k)-th error is minimized which is calculated by referring to the (1-k)-th training characteristic information Fk(xk') and the (2-k)-th training characteristic information Fk(xk) and such that (2-k)-th error is maximized which is calculated by referring to the training data x and the k-th obfuscated training data xk', thereby allowing the (k−1)-st trained obfuscation network O(k−1) to become the k-th trained obfuscation network Ok.

Figure 9:
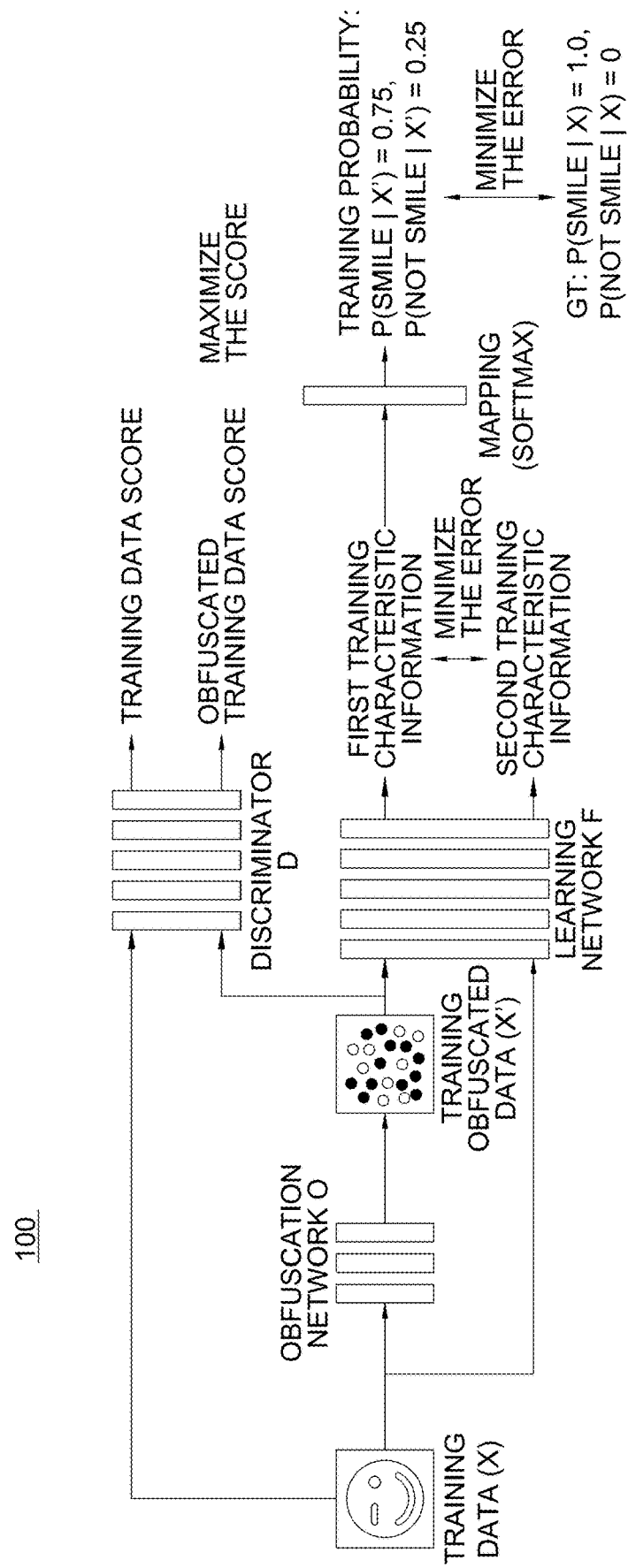
FIG. 9 is a drawing schematically illustrating still another method for training the obfuscation network capable of obfuscating the images taken from the cameras in accordance with one example embodiment of the present disclosure.

FIG. 9 is a drawing schematically illustrating still another method for training the obfuscation network capable of obfuscating the images taken from the cameras in accordance with one example embodiment of the present disclosure. In the explanation below, the detailed description for the part that is easily understandable in the explanations of FIG. 7 and FIG. 8 above shall be omitted.

Firstly, in response to acquiring the training data x, the learning device 100 inputs the training data x into the obfuscation network O, and instructs the obfuscation network to obfuscate the training data x, to thereby generate obfuscated training data x', i.e., O(x).

Next, the learning device 100 may input the obfuscated training data x' into the learning network F with trained parameters and instruct the learning network F to apply learning operations to the obfuscated training data x' by using the trained parameters, to thereby generate first training characteristic information F(x') corresponding to the obfuscated training data x' and may input the training data x into the learning network F and instruct the learning network F to apply learning operations to the training data x by using the trained parameters, to thereby generate second training characteristic information F(x).

Next, on condition that obfuscated training data score has been acquired as the second error, wherein the obfuscated training data score corresponds to the obfuscated training data x' inputted to a discriminator D capable of determining whether its input data is real or fake, the learning device 100 (i) may train the obfuscation network O such that the first error is minimized which is calculated by referring to the first training characteristic information F(x') and the second training characteristic information F(x) and such that the second error is maximized, and (ii) may train the discriminator D such that training data score corresponding to the training data inputted into the discriminator D is maximized, and such that the obfuscated training data score is minimized.

That is, the learning device 100 may train the obfuscation network O such that the obfuscated training data x' is recognized to be identical or similar to the training data x by the learning network F through the first error and such that the obfuscated training data x' is recognized to be different from the original data x by a human or by a general device (e.g., a device without including any machine learning network) through the second error.

Herein, the maximum value of the training data score corresponding to the training data x inputted into the discriminator D is 1 for identifying the training data x as real, and the minimum value of the obfuscated training data score corresponding to the obfuscated training data x' inputted into the discriminator D is 0 for identifying the obfuscated training data x' as fake.

Meanwhile, the learning device 100 may acquire the first error by further referring to at least one class loss. Herein, the class loss may be acquired by referring to each probability of each class of the obfuscated training data x' being recognized as a result of mapping the first training characteristic information F(x') into each class and the ground truth corresponding to the training data x.

In addition, in case the learning device 100 trains the obfuscation network O such that the first error is minimized and the second error is maximized, the trained parameters of the learning network F are fixed, i.e., not updated, and training processes are applied only to the obfuscation network O.

Figure 10:
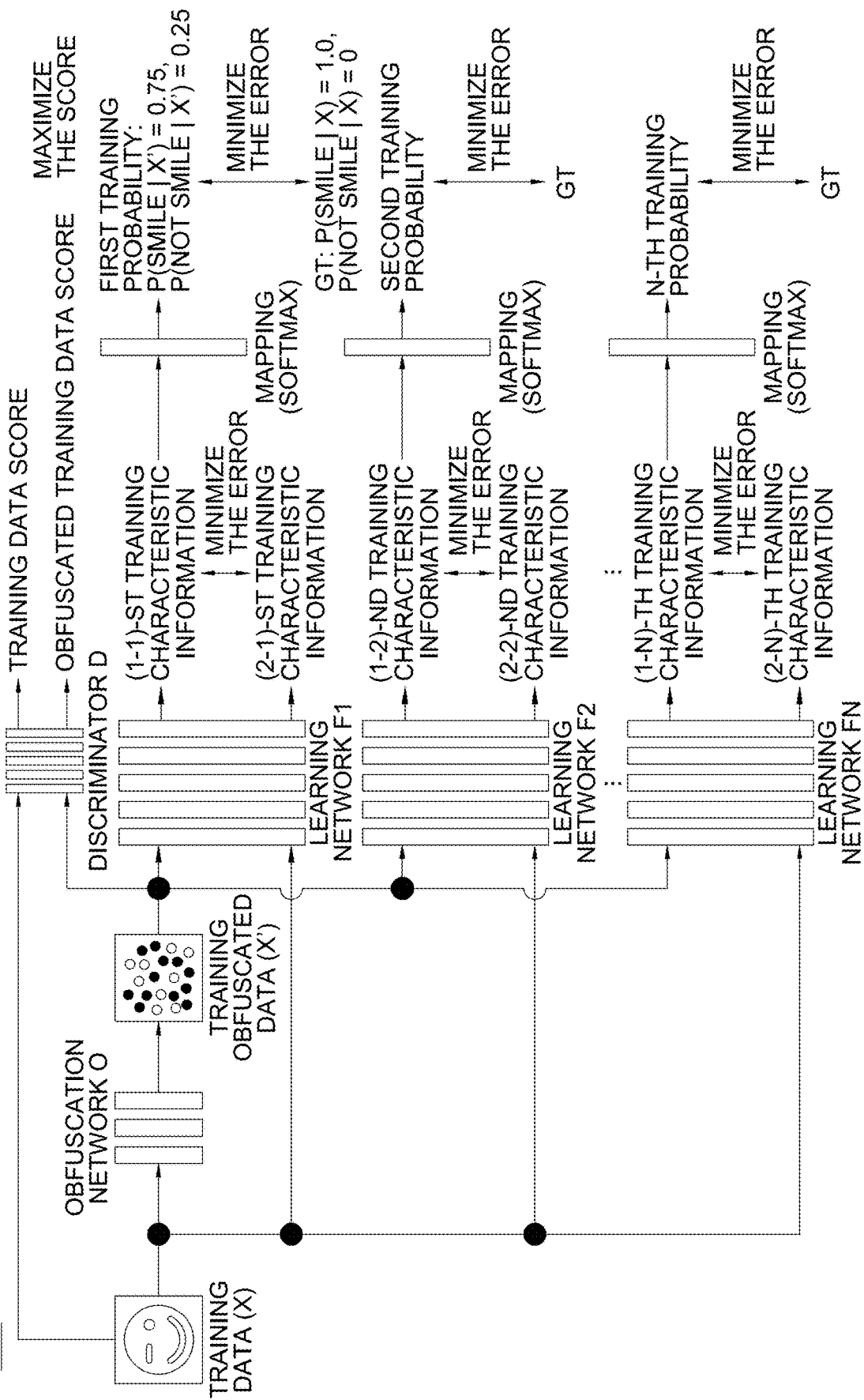
FIG. 10 is a drawing schematically illustrating still yet another method for training the obfuscation network capable of obfuscating the images taken from the cameras in accordance with one example embodiment of the present disclosure.

FIG. 10 is a drawing schematically illustrating still yet another method for training the obfuscation network capable of obfuscating the images taken from the cameras in accordance with one example embodiment of the present disclosure. In the explanation below, the detailed description for the part that is easily understandable from the explanations of FIG. 7 to FIG. 9 above shall be omitted.

Firstly, in response to acquiring the training data x, the learning device 100 inputs the training data x into the obfuscation network O, and instructs the obfuscation network O to obfuscate the training data x, to thereby generate the obfuscated training data x', i.e., O(x).

Next, the learning device 100 may input the obfuscated training data x' respectively into the first learning network F1 to the n-th learning network Fn with the first trained parameter to the n-th trained parameter, and instruct the first learning network F1 to the n-th learning network Fn to respectively apply learning operations to the obfuscated training data x' by using the first trained parameter to the n-th trained parameter of the first learning network F1 to the n-th learning network Fn, to thereby generate the (1-1)-st training characteristic information F1(x') to the (1-n)-th training characteristic information Fn(x') corresponding to the obfuscated training data x'. Moreover, the learning device 100 may input the training data x respectively into the first learning network F1 to the n-th learning network Fn with the first trained parameter to the n-th trained parameter, and instruct the first learning network F1 to the n-th learning network Fn to respectively apply learning operations to the training data x by using the first trained parameter to the n-th trained parameter of the first learning network F1 to the n-th learning network Fn, to thereby generate the (2-1)-st training characteristic information F1(x) to the (2-n)-th training characteristic information Fn(x).

Next, the learning device 100 may (i) train the obfuscation network O such that the first error is minimized which is the average of the (1-1)-st error calculated by referring to the (1-1)-st training characteristic information F1(x') and the (2-1)-st training characteristic information F1(x) to the (1-n)-th error calculated by referring to the (1-n)-th training characteristic information Fn(x') and the (2-n)-th training characteristic information Fn(x), and such that the second error is maximized which is the obfuscated training data score corresponding to the obfuscated training data x' inputted into the discriminator D, and (ii) train the discriminator D such that the training data score corresponding to the training data x inputted into the discriminator D is maximized, and such that the obfuscated training data score is minimized.

That is, the learning device 100 acquires the (1-1)-st error calculated by referring to the (1-1)-st training characteristic information F1(x') and the (2-1)-st training characteristic information F1(x), and acquires the (1-2)-nd error calculated by referring to the (1-2)-nd training characteristic information F2(x') and the (2-2)-nd training characteristic information F2(x), and so on. As a result, the learning device 100 acquires the (1-n)-th error calculated by referring to the (1-n)-th training characteristic information Fn(x') and the (2-n)-th training characteristic information Fn(x). Then, the learning device 100 acquires the first error by using the average of the (1-1)-st error to the (1-n)-th error. In addition, the learning device 100 may train the obfuscation network O such that the first error is minimized and the second error is maximized.

Meanwhile, the learning device 100 acquires the (1-1)-st error by further referring to a first class loss. Herein, the first class loss is acquired by referring to each first probability of each class of the obfuscated training data x' being recognized as a result of mapping the (1-1)-st training characteristic information F(x') into each class and the ground truth corresponding to the training data x. That is, the learning device 100 may acquire the (1-1)-st error by adding the first class loss to the difference between the (1-1)-st training characteristic information F1(x') and the (2-1)-st training characteristic information F1(x). In addition, the learning device 100 acquires the (1-2)-nd error by further referring to a second class loss. Herein, the second class loss is acquired by referring to each second probability of each class of the obfuscated training data x' being recognized as a result of mapping the (1-2)-nd training characteristic information F2(x') into each class and the ground truth corresponding to the training data x. The above-mentioned processes may be repeated. Accordingly, the learning device 100 acquires the (1-n)-th error by further referring to an n-th class loss. Herein, the n-th class loss is acquired by referring to each n-th probability of each class of the obfuscated training data x' being recognized as a result of mapping the (1-n)-th training characteristic information Fn(x') into each class and the ground truth corresponding to the training data x. Then, the learning device 100 may acquire the first error which is the average of the (1-1)-st error to the (1-n)-th error. In addition, the learning device 100 may train the obfuscation network O such that the first error is minimized and the second error is maximized.

In addition, in case the learning device 100 trains the obfuscation network O such that the first error is minimized and the second error is maximized, the trained parameters of the learning network F are fixed, i.e., not updated, and training processes are applied only to the obfuscation network O.

Meanwhile, in the above, the (1-1)-st error to the (1-n)-th error are calculated respectively by using (i) the (1-1)-st training characteristic information F1(x') to the (1-n)-th training characteristic information Fn(x') respectively acquired by inputting the obfuscated training data x' into the first learning network F1 to the n-th learning network Fn and (ii) the (2-1)-st training characteristic information F1(x) to the (2-n)-th training characteristic information Fn(x) respectively acquired by inputting the training data x into the first learning network F1 to the n-th learning network Fn. Then, the first error is acquired by using the average of the (1-1)-st error to the (1-n)-th error. Thereafter, the obfuscation network O is trained such that the first error is minimized and such that the second error is maximized. However, unlike the above, the learning device 100 may sequentially train the obfuscation network O such that the (1-1)-st error to the (1-n)-th error are sequentially minimized.

That is, the learning device 100 inputs the training data x into the obfuscation network O, and instructs the obfuscation network O to generate the first obfuscated training data x1' by obfuscating the training data x. In addition, the learning device 100 inputs the first obfuscated training data x1' into the first learning network F1, and instructs the first learning network F1 to apply learning operations to the first obfuscated training data x1' by using the first trained parameter of the first learning network F1, to thereby output the (1-1)-st training characteristic information F1(x1') for the first obfuscated training data x1', and inputs the training data x into the first learning network F1, and instructs the first learning network F1 to apply learning operations to the training data x by using the first trained parameter of the first learning network F1, to thereby output the (2-1)-st training characteristic information F1(x) for the training data x. Thereafter, the learning device 100 trains the obfuscation network O such that (1-1)-st error is minimized which is calculated by referring to the (1-1)-st training characteristic information F1(x1') and the (2-1)-st training characteristic information F1(x) and such that the (2-1)-st error is maximized which is the first obfuscated training data score corresponding to the first obfuscated training data x1' inputted into the discriminator D, thereby allowing the obfuscation network O to become the first trained obfuscation network O1. Further, the learning device 100 trains the discriminator D such that the first training data score corresponding to the training data inputted to the discriminator D is maximized and such that the first obfuscated training data score is minimized, thereby allowing the discriminator D to become the first trained discriminator D1.

In addition, the learning device 100 increases the constant k from 2 to n and repeats the above operations up to the n-th learning network Fn, thereby acquiring the n-th trained obfuscation network On.

That is, the learning device 100 inputs the training data x into the (k−1)-st trained obfuscation network O(k−1), and instructs the (k−1)-st obfuscation network O(k−1) to generate the k-th obfuscated training data xk' by obfuscating the training data x. In addition, the learning device 100 may (i) input the k-th obfuscated training data xk' into the k-th learning network, and instruct the k-th learning network Fk to apply learning operations to the k-th obfuscated training data xk' by using the k-th trained parameter of the k-th learning network Fk, to thereby output the (1-k)-th training characteristic information Fn(xk') for the k-th obfuscated training data xk', and (ii) input the training data x into the k-th learning network Fk, and instructs the k-th learning network Fk to apply learning operations to the training data x by using the k-th trained parameter of the k-th learning network Fk, to thereby output the (2-k)-th training characteristic information Fk(xk) for the training data x. Thereafter, the learning device 100 may train the (k−1)-st trained obfuscation network O(k−1) such that (1-k)-th error is minimized which is calculated by referring to the (1-k)-th training characteristic information Fk(xk') and the (2-k)-th training characteristic information Fk(x) and such that the (2-k)-th error is maximized which is the k-th obfuscated training data score corresponding to the k-th obfuscated training data xk' inputted into the (k−1)-st trained discriminator D(k−1), thereby allowing the (k−1)-th trained obfuscation network O(k−1) to become the k-th trained obfuscation network Ok. Further, the learning device 100 trains the (k−1)-st trained discriminator D(k−1) such that the k-th training data score corresponding to the training data x inputted to the (k−1)-st trained discriminator D(k−1) is maximized and such that the k-th obfuscated training data score is minimized, thereby allowing the (k−1)-st trained discriminator D(k−1) to become the k-th trained discriminator Dk.

The present disclosure has an effect of allowing obfuscated target objects to be tracked in a multiuse facility.

The present disclosure has another effect of allowing specific obfuscated tracking information to be matched with specific non-obfuscated identification information in response to acquiring consent information on disclosure of the specific non-obfuscated identification information from a specific target object among the target objects.

The present disclosure has still another effect of increasing a usability of data by matching the specific obfuscated tracking information with the specific non-obfuscated identification information.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for tracking one or more objects in a specific space, comprising steps of:
   (a) an obfuscation tracking device inputting original images of the specific space taken from at least one camera to an obfuscation network, which has been trained by applying at least one network operation to obfuscated training data through a learning network with one or more trained parameters to obfuscate the original images such that obfuscated images are not identifiable as the original images by a human but the obfuscated images are identifiable as the original images by the learning network, and instructing the obfuscation network to obfuscate the original images to generate the obfuscated images such that the obfuscated images are not identifiable as the original images by the human but the obfuscated images are identifiable as the original images by the learning network;
   (b) the obfuscation tracking device (i) inputting the obfuscated images into the learning network, and (ii) instructing the learning network to detect one or more obfuscated target objects, corresponding to one or more target objects to be tracked, in the obfuscated images, to thereby output information on the obfuscated target objects; and
   (c) the obfuscation tracking device tracking the obfuscated target objects in the specific space by referring to the information on the obfuscated target objects.

2. The method of claim 1, further comprising a step of:
   (d) the obfuscation tracking device, in response to acquiring consent information on disclosure of specific non-obfuscated identification information from a specific target object among the target objects, matching specific obfuscated tracking information with the specific non-obfuscated identification information, wherein the specific obfuscated tracking information is acquired by tracking the specific target object.

3. The method of claim 1, wherein, at the step of (c), the obfuscation tracking device confirms whether pre-acquired consent information on disclosure of non-obfuscated identification information corresponding to the obfuscated target objects is present, and wherein, in case a specific obfuscated target object is determined as having pre-acquired consent information on disclosure of specific non-obfuscated identification information, the obfuscation tracking device matches the specific non-obfuscated identification information with the specific obfuscated target object and tracks the specific obfuscated target object matched with the specific non-obfuscated identification information.

4. The method of claim 1, wherein, at the step of (a), the obfuscation tracking device acquires the obfuscated images generated by obfuscating the original images through the obfuscation network (i) from the one or more cameras or (ii) from NVR (network image recorder) that stores the original images.

5. The method of claim 1, wherein the information on the obfuscated target objects includes obfuscated area data corresponding to the obfuscated target objects, location information of the obfuscated target objects and at least part of metadata of camera taking pictures of the obfuscated target objects.

6. The method of claim 1, wherein the obfuscated tracking information includes trajectory information and status information of the target objects.

7. The method of claim 1, wherein a learning device has trained the obfuscation network by performing processes of (i) inputting training data into the obfuscation network and instructing the obfuscation network to generate the obfuscated training data by obfuscating the training data, (ii) (ii-1) inputting the obfuscated training data into the learning network with one or more of the trained parameters and (ii-2) instructing the learning network to apply the at least one network operation to the obfuscated training data by using the trained parameters, to thereby generate characteristic information corresponding to the obfuscated training data and (iii) training the obfuscation network such that at least one first error is minimized which is calculated by referring to (1) the characteristic information or task specific output generated by using the characteristic information and (2) its corresponding ground truth and (iii-2) at least one second error is maximized which is calculated by referring to the training data and the obfuscated training data.

8. The method of claim 7, wherein, on condition that obfuscated training data score has been acquired as the second error, wherein the obfuscated training data score corresponds to the obfuscated training data inputted to a discriminator capable of determining whether its input data is real or fake, the learning device (i) trains the obfuscation network such that the first error is minimized and the second error is maximized and (ii) trains the discriminator such that (ii-1) modified training data score or modified obfuscated training data score respectively corresponding to modified training data or modified obfuscated training data inputted into the discriminator is maximized, wherein the modified training data or the modified obfuscated training data is acquired respectively by modifying the training data or the obfuscated training data and (ii-2) the obfuscated training data score is minimized.

9. An obfuscation tracking device for tracking one or more objects in a specific space, comprising:
   at least one memory that stores instructions; and
   at least one processor configured to execute the instructions to perform or support another device to perform:
   (I) inputting original images of the specific space taken from at least one camera to an obfuscation network, which has been trained by applying at least one network operation to obfuscated training data through a learning network with one or more trained parameters to obfuscate the original images such that obfuscated images are not identifiable as the original images by a human but the obfuscated images are identifiable as the original images by the learning network, and instructing the obfuscation network to obfuscate the original images to generate the obfuscated images such that the obfuscated images are not identifiable as the original images by the human but the obfuscated images are identifiable as the original images by the learning network; (II) inputting the obfuscated images into the learning network, and instructing the learning network to detect one or more obfuscated target objects, corresponding to one or more target objects to be tracked, in the obfuscated images, to thereby output information on the obfuscated target objects; and (III) tracking the obfuscated target objects in the specific space by referring to the information on the obfuscated target objects.

10. The obfuscation tracking device of claim 9, wherein the processor further performs a process of: (IV) in response to acquiring consent information on disclosure of specific non-obfuscated identification information from a specific target object among the target objects, matching specific obfuscated tracking information with the specific non-obfuscated identification information, wherein the specific obfuscated tracking information is corresponding to the specific target object.

11. The obfuscation tracking device of claim 9, wherein, at the process of (III), the processor confirms whether pre-acquired consent information on disclosure of non-obfuscated identification information corresponding to the obfuscated target objects is present, and wherein, in case a specific obfuscated target object is determined as having pre-acquired consent information on disclosure of specific non-obfuscated identification information, the obfuscation tracking device matches the specific non-obfuscated identification information with the specific obfuscated target object and tracks the specific obfuscated target object matched with the specific non-obfuscated identification information.

12. The obfuscation tracking device of claim 9, wherein, at the process of (I), the processor acquires the obfuscated images generated by obfuscating the original images through the obfuscation network (i) from the one or more cameras or (ii) from NVR (network image recorder) that stores the original images.

13. The obfuscation tracking device of claim 9, wherein the information on the obfuscated target objects includes obfuscated area data corresponding to the obfuscated target objects, location information of the obfuscated target objects and at least part of metadata of camera taking pictures of the obfuscated target objects.

14. The obfuscation tracking device of claim 9, wherein the obfuscated tracking information includes trajectory information and status information of the target objects.

15. The obfuscation tracking device of claim 9, wherein a learning device has trained the obfuscation network by performing processes of (i) inputting training data into the obfuscation network and instructing the obfuscation network to generate the obfuscated training data by obfuscating the training data, (ii) (ii-1) inputting the obfuscated training data into the learning network with the one or more trained parameters and (ii-2) instructing the learning network to apply the at least one network operation to the obfuscated training data by using the trained parameters, to thereby generate characteristic information corresponding to the obfuscated training data and (iii) training the obfuscation network such that at least one first error is minimized which is calculated by referring to (1) the characteristic information or task specific output generated by using the characteristic information and (2) its corresponding ground truth and (iii-2) at least one second error is maximized which is calculated by referring to the training data and the obfuscated training data.

16. The obfuscation tracking device of claim 15, wherein, on condition that obfuscated training data score has been acquired as the second error, wherein the obfuscated training data score corresponds to the obfuscated training data inputted to a discriminator capable of determining whether its input data is real or fake, the learning device (i) trains the obfuscation network such that the first error is minimized and the second error is maximized and (ii) trains the discriminator such that (ii-1) modified training data score or modified obfuscated training data score respectively corresponding to modified training data or modified obfuscated training data inputted into the discriminator is maximized, wherein the modified training data or the modified obfuscated training data is acquired respectively by modifying the training data or the obfuscated training data and (ii-2) the obfuscated training data score is minimized.

* * * * *